United States Patent
Niu et al.

(10) Patent No.: US 12,245,076 B2
(45) Date of Patent: Mar. 4, 2025

(54) EFFICIENT SIGNALING IN NON-TERRESTRIAL AND TERRESTRIAL NETWORK DEPLOYMENT

(71) Applicant: ZTE Corporation, Guangdong (CN)

(72) Inventors: Li Niu, Guangdong (CN); Bo Dai, Guangdong (CN); Xiubin Sha, Guangdong (CN); Ting Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 330 days.

(21) Appl. No.: 17/808,480

(22) Filed: Jun. 23, 2022

(65) Prior Publication Data

US 2022/0322184 A1 Oct. 6, 2022

Related U.S. Application Data

(63) Continuation of application No. PCT/CN2020/100098, filed on Jul. 3, 2020.

(51) Int. Cl.
*H04W 36/08* (2009.01)
*H04W 28/06* (2009.01)
*H04W 76/28* (2018.01)
*H04W 84/06* (2009.01)

(52) U.S. Cl.
CPC ........... *H04W 28/06* (2013.01); *H04W 76/28* (2018.02); *H04W 36/083* (2023.05); *H04W 84/06* (2013.01)

(58) Field of Classification Search
CPC .... H04W 76/28; H04W 36/083; H04W 84/06
See application file for complete search history.

(56) References Cited

U.S. PATENT DOCUMENTS

| 9,332,584 | B2 | 5/2016 | Verger et al. | |
|---|---|---|---|---|
| 2016/0135092 | A1* | 5/2016 | Park | H04W 36/04 455/436 |
| 2018/0192468 | A1* | 7/2018 | Martin | H04W 52/0216 |
| 2020/0245395 | A1* | 7/2020 | Zhang | H04W 76/28 |

(Continued)

FOREIGN PATENT DOCUMENTS

| CN | 104602259 | 5/2015 |
|---|---|---|
| CN | 109842962 | 6/2019 |
| EP | 2753125 | 9/2014 |

(Continued)

OTHER PUBLICATIONS

First Examination Report for co-pending AU Application No. 2020456397, dated Jan. 20, 2023, 3 pages.

(Continued)

*Primary Examiner* — Derrick V Rose
(74) *Attorney, Agent, or Firm* — Perkins Coie LLP (57) ABSTRACT

Methods, apparatus, and systems for reducing signaling overhead and power consumption while ensuring mobility of communication devices in non-terrestrial network deployment as well as terrestrial network deployment are disclosed. In one example aspect, a wireless communication method includes receiving, by a communication device from a wireless communication node, information comprising a configuration parameter that corresponds to a length of a discontinuous reception cycle of the communication device. The method also includes performing, by the communication device, an operation based on the configuration parameter.

20 Claims, 7 Drawing Sheets

(56) References Cited

U.S. PATENT DOCUMENTS

2021/0076278 A1* 3/2021 Tang ................... H04W 24/08

FOREIGN PATENT DOCUMENTS

WO    2007/088381    8/2007
WO    2016/010904    1/2016

OTHER PUBLICATIONS

IP Australia, Notice of Acceptance for Australian Application No. 2020456397, mailed on Jan. 12, 2024, 3 pages.
First Examination Report for co-pending Indian Application No. 202247031713, dated Dec. 1, 2023, 4 pages.
International Search Report and Written Opinion for PCT/CN2020/100098, dated Apr. 2, 2021, 6 pages.
Samsung, "Further Considerations on multiple C-DRX," 3GPP TSG-RAN WG2 Meeting #108 R2-1916152, Reno, USA, Nov. 18-22, 2019, 3 pages.
Xinwei, "The issues on the C-eDRX" 3GPP TSG RAN WG2 Meeting #91 R2-153576, Beijing, China, Aug. 24-28, 2015, 3 pages.
Extended European Search Report for co-pending EP Application No. 20942771.5, dated Nov. 11, 2022, 10 pages.
3GPP "Technical Specification Group Radio Access Network; Evolved Universal Terrestrial Radio Access (E-UTRA); User Equipment (UE) procedures in idle mode (Release 16)" 3GPP TS 36.304 V16.0.0 (Mar. 2020), 58 pages.

* cited by examiner

EFFICIENT SIGNALING IN NON-TERRESTRIAL AND TERRESTRIAL NETWORK DEPLOYMENT

CROSS-REFERENCE TO RELATED APPLICATION

This application is a continuation and claims priority to International Application No. PCT/CN2020/100098, filed on Jul. 3, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques related to reducing signaling overhead and power consumption while ensuring mobility of communication devices in non-terrestrial network deployment as well as terrestrial network deployment.

In one example aspect, a wireless communication method is disclosed. The method includes receiving, by a communication device from a wireless communication node, information comprising a configuration parameter that corresponds to a length of a discontinuous reception cycle of the communication device. The method also includes performing, by the communication device, an operation based on the configuration parameter.

In another example aspect, a wireless communication method is disclosed. The method includes transmitting, by wireless communication node, information comprising a configuration parameter that corresponds to a length of a discontinuous reception cycle of the communication device to enable the communication device to perform an operation based on the configuration parameter.

In another example aspect, a wireless communication method is disclosed. The method includes receiving, by a communication device from wireless communication node, information specifying a condition associated with an operation to be performed by the communication device. The method also includes initiating the operation by the communication device in case the condition is satisfied.

In another example aspect, a wireless communication method is disclosed. The method includes transmitting, by wireless communication node to a communication device, information associated with an operation to enable the communication device to initiate the operation based on the information.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems or satellite wireless systems.

In terrestrial deployments, such as 5G terrestrial communication systems, the network systems are mainly located in densely-populated areas. In sparsely-populated places, network deployments can be expensive. Certain areas may have no network available due to the cost. Yet, there is a great demand to collect data in remote regions (e.g., to collect meteorological data in mountain areas or deserts). Such high demand can be met by non-terrestrial deployments, in which satellites can supply the large coverage in remote regions. The non-terrestrial network deployments can be adopted as an extension to terrestrial network coverage.

Figure 1:
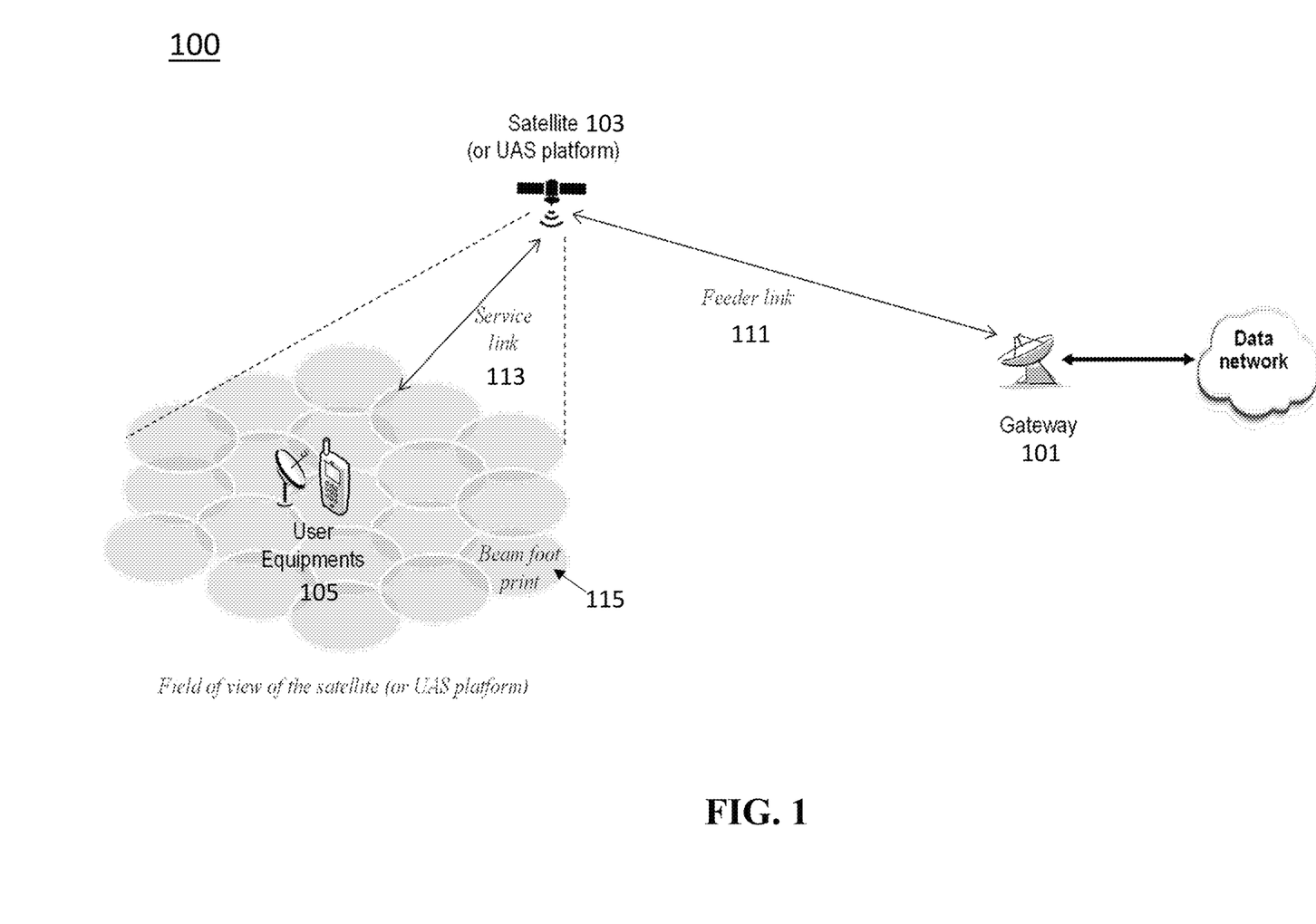
FIG. 1 illustrates an example scenario of a non-terrestrial network (NTN) deployment that provides access to user equipment in accordance with one or more embodiments of the present technology.

FIG. 1 illustrates an example scenario 100 of a non-terrestrial network (NTN) deployment that provides access to user equipment in accordance with one or more embodiments of the present technology. As shown in FIG. 1, an NTN gateway 101 is a station or a gateway deployed at the surface of Earth. The NTN gateway 101 can provide sufficient radio-frequency (RF) power and RF sensitivity for accessing to the satellite 103. In some embodiments, the NTN gateway 101 can be a transport network layer (TNL) node. The wireless link between the NTN gateway 101 and the satellite 103 can be referred to as the feeder link 111. The radio link between the satellite 103 and the User Equipment (communication devices) 105 can be referred to as the service link 113. The satellite (or UAS platform) 107 generates several beams over a given service area bounded by its field of view. The footprints of the beams are typically of elliptic shape 115.

The satellite 103 can be placed into a Low-Earth Orbit (LEO), or a Geostationary Earth Orbit (GEO). The GEO is the circular orbit at 35,786 km above the Earth's equator following the direction of the Earth's rotation. A GEO satellite in such an orbit has an orbital period equal to the Earth's rotational period and thus appears motionless to the ground observers at a fixed position in the sky. The typical beam footprint size of a GEO satellite is 200 to 3500 km. The LEO is the orbit around the Earth with an altitude between 300 km and 1500 km. A LEO satellite in such an orbit encircles around the earth with the speed of 7.56 km per second. The typical beam footprint size of a LEO satellite is 100 to 1000 km.

With the advancement of wireless communication technology, usage of Internet of Things (IoT), a system of interrelated computing devices, has become more prevalent. Connectivity for IoT systems requires large coverage areas. Therefore, non-terrestrial network deployment can be desirable as an expansion of terrestrial networks to ensure stable connection of IoT devices.

However, non-terrestrial network deployment brings new challenges for existing Narrow Band IoT (NB-IoT) or enhanced Machine Type Communication (eMTC) systems. For example, due to fast movement of LEO satellites, the satellite beams or the cell providing coverage for a stationary communication device on the Earth's surface change frequently. If a communication device is served by an NTN LEO cell of diameter between 50 km to 1000 km, the communication device can remain connected for a maximum of 6.61 seconds to 132.38 seconds due to satellite movement. As a result, a stationary communication device has to keep performing cell updates in the idle state (e.g., RRC idle) as well as connected state (e.g., RRC connected). Constant updates increase signaling overhead and power consumption of the communication device. This patent document discloses techniques that can be implemented in various embodiments of a communication device (e.g., a user equipment) to reduce signaling overhead as well as power consumption while allowing the communication device to maintain mobility. The techniques are applicable to NTN deployments, but they can be similarly applicable to terrestrial networks.

Figure 2A:
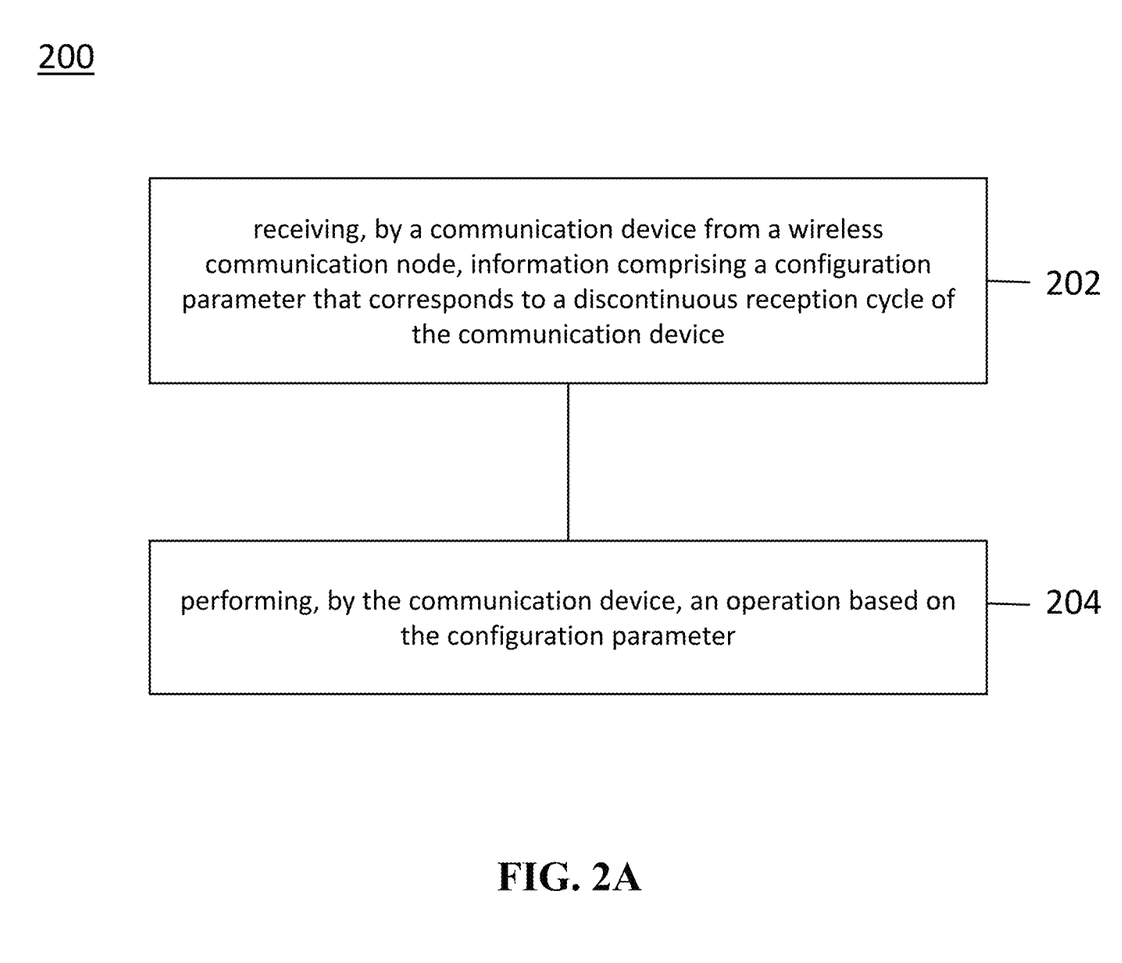
FIG. 2A is a flowchart representation of a method for wireless communication in accordance with one or more embodiments of the present technology.

FIG. 2A is a flowchart representation of a method 200 for wireless communication in accordance with one or more embodiments of the present technology. The method 200 includes, at operation 202, receiving, by a communication device from a wireless communication node, information comprising a configuration parameter that corresponds to a length of a discontinuous reception cycle of the communication device. The method 200 includes, at operation 204, performing, by the communication device, an operation based on the configuration parameter.

In some embodiments, the configuration parameter is part of a plurality of configuration parameters included in the information from the wireless communication node. The method also includes selecting, by the communication device, the configuration parameter from the plurality of configuration parameters based on the discontinuous reception cycle of the communication device.

Figure 2B:
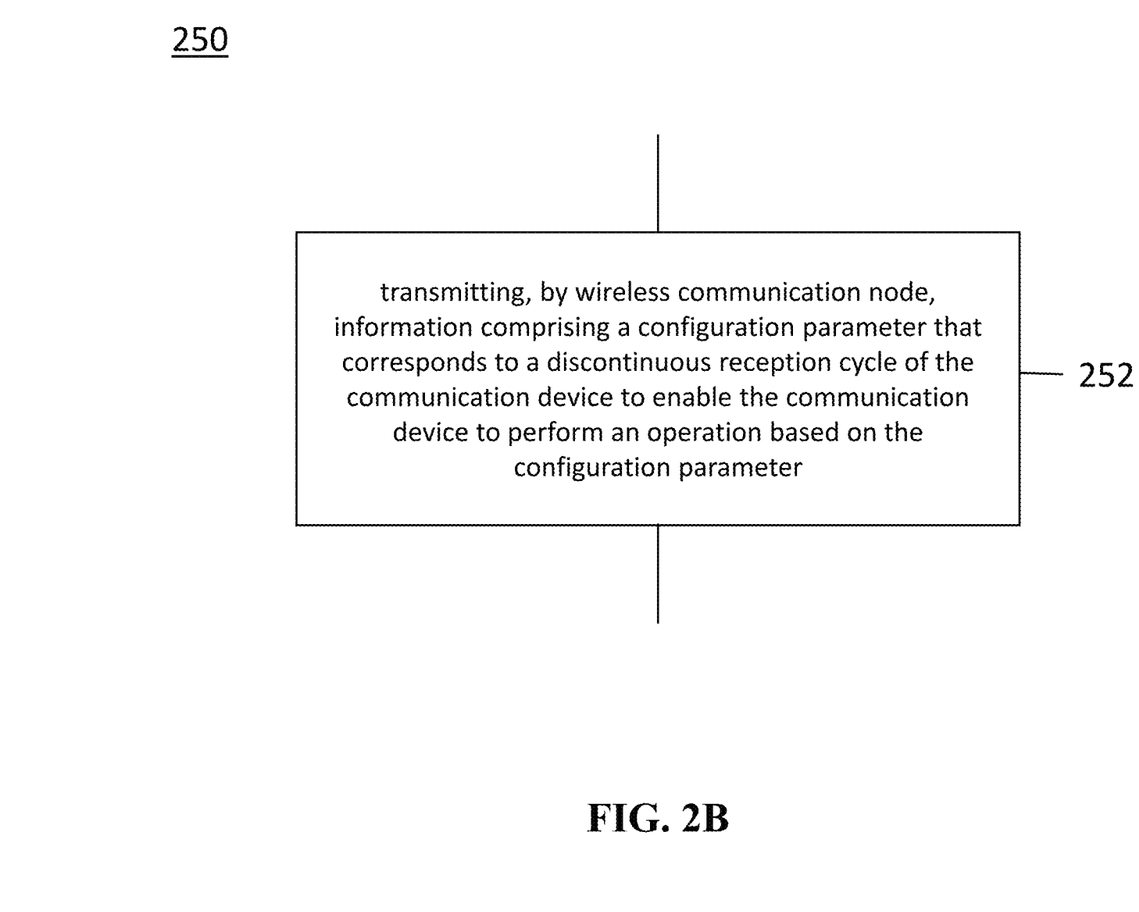
FIG. 2B is a flowchart representation of another method for wireless communication in accordance with one or more embodiments of the present technology.

FIG. 2B is a flowchart representation of a method 250 for wireless communication in accordance with one or more embodiments of the present technology. The method 250 includes, at operation 252, transmitting, by wireless communication node, information comprising a configuration parameter that corresponds to a length of a discontinuous reception cycle of the communication device to enable the communication device to perform an operation based on the configuration parameter.

In some embodiments, the operation comprises a cell reselection procedure. In some embodiments, the operation comprises an intra-frequency or inter-frequency measurement. In some embodiments, the configuration parameter is part of a plurality of configuration parameters included in the information that corresponds to lengths of a plurality of discontinuous reception cycles. In some embodiments, the configuration parameter indicates a condition corresponding to the discontinuous reception cycle that triggers the operation. In some embodiments, the configuration parameter comprises at least one of: a cell reselection timer value, a priority of frequency, or an offset to be used for cell reselection. In some embodiments, the cell reselection timer value or the offset to be used for cell reselection negatively correlates to a length of the discontinuous reception cycle of the communication device. In some embodiments, the configuration parameter comprises a neighboring cell list.

In some embodiments, the configuration parameter is part of multiple sets of configuration parameters for the cell reselection procedure, each set corresponding to a length of a discontinuous reception cycle, the length comprising a threshold length of a discontinuous reception cycle or comprises a discontinuous reception cycle supported by the communication device. In some embodiments, each discontinuous reception cycle is associated with an index, and east set of configuration parameters corresponds to one or more indices associated with one or more discontinuous reception cycles. In some embodiments, each discontinuous reception cycle is associated with an index, and multiple sets of configuration parameters correspond to a bitmap that comprises bits ordered according to indices of discontinuous reception cycles. In some embodiments, the configuration parameter indicates an invalid value related to the discontinuous reception cycle of the communication device.

Figure 3A:
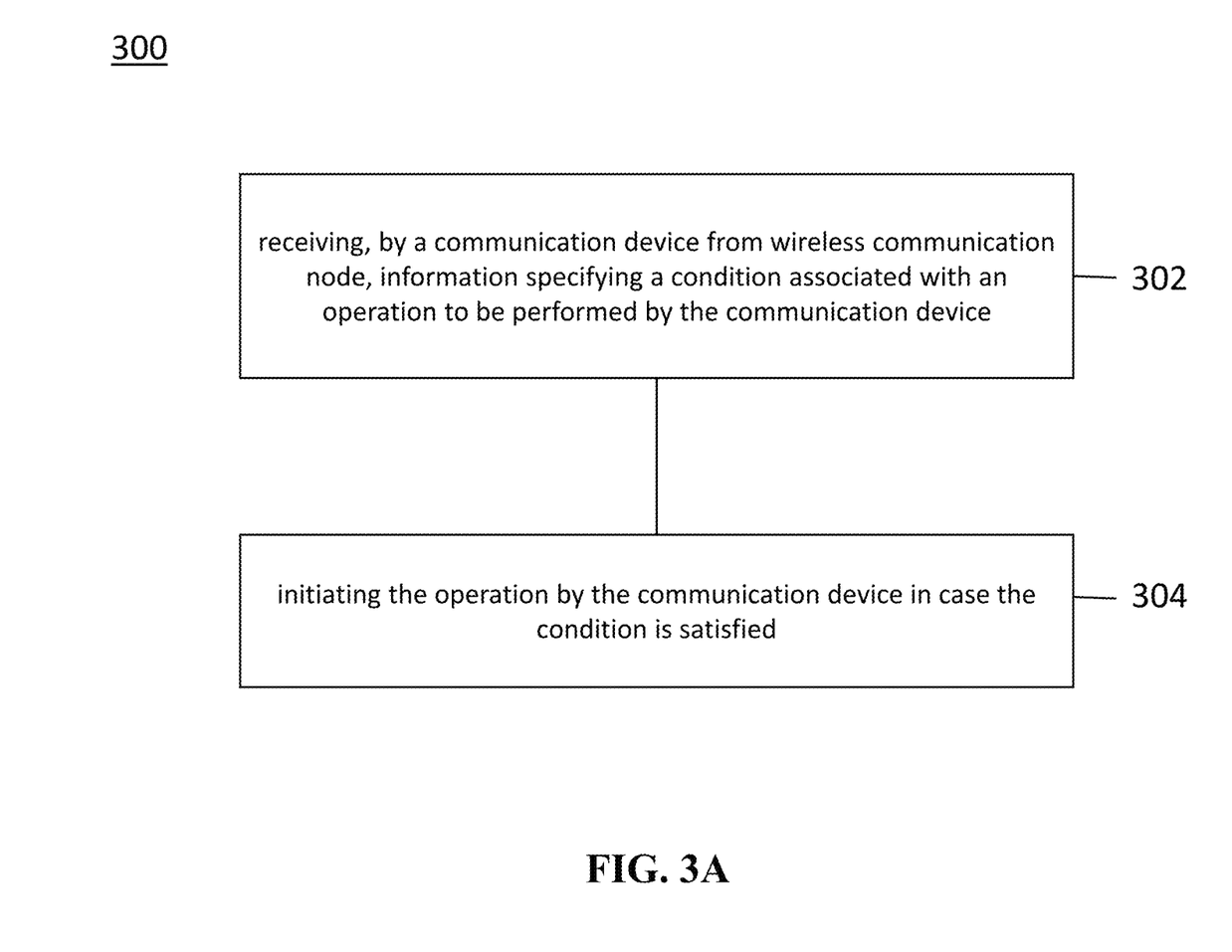
FIG. 3A is a flowchart representation of another method for wireless communication in accordance with one or more embodiments of the present technology.

FIG. 3A is a flowchart representation of a method 300 for wireless communication in accordance with one or more embodiments of the present technology. The method 300 includes, at operation 302, receiving, by a communication device from wireless communication node, information specifying a condition associated with an operation to be performed by the communication device. The method 300 includes, at operation 304, initiating the operation by the communication device in case the condition is satisfied. In some embodiments, the method includes transmitting, by the communication device, a notification to the base station indicating a completion of the operation.

Figure 3B:
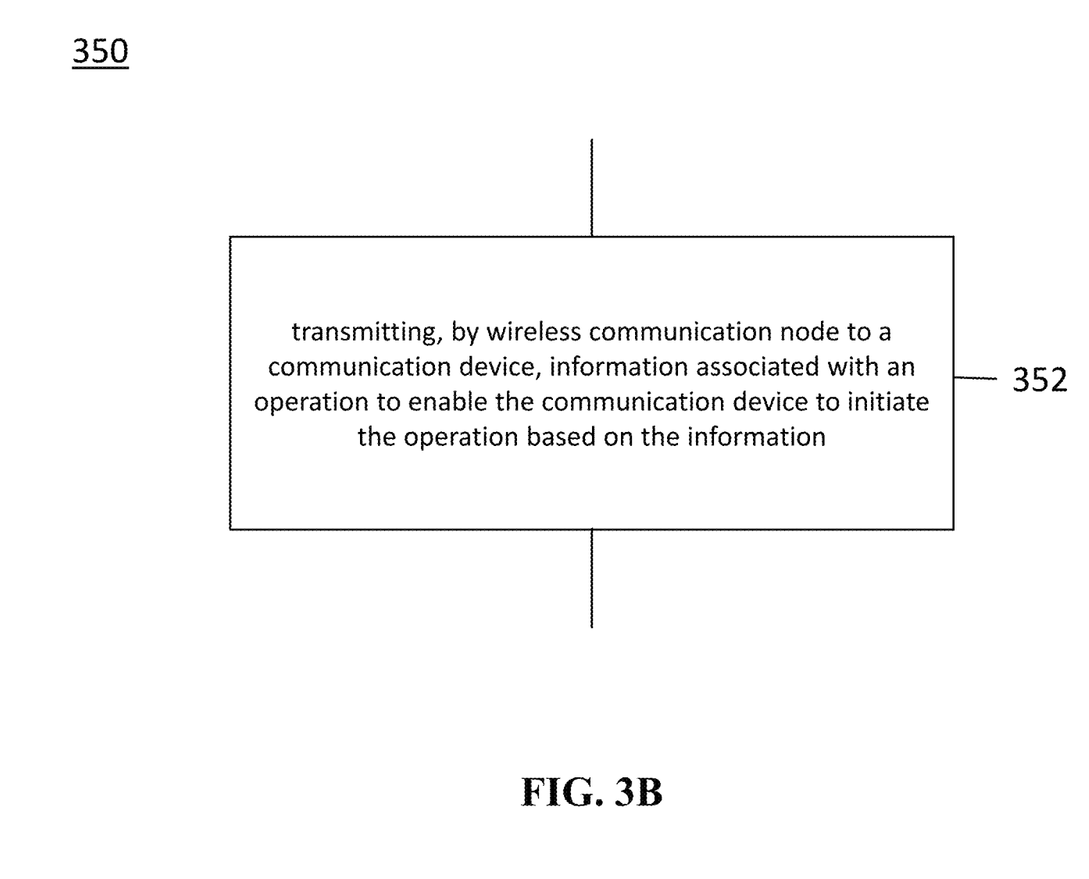
FIG. 3B is a flowchart representation of yet another method for wireless communication in accordance with one or more embodiments of the present technology.

FIG. 3B is a flowchart representation of a method 350 for wireless communication in accordance with one or more embodiments of the present technology. The method 350 includes, at operation 352, transmitting, by wireless communication node to a communication device, information associated with an operation to enable the communication device to initiate the operation based on the information.

In some embodiments, the operation comprises one of: (1) an intra-frequency or inter-frequency measurement, (2) a Radio Resource Control (RRC) reestablishment procedure, or (3) a carrier switch procedure. In some embodiments, the information includes a threshold of timing advance associated with the operation, a threshold of signal to interference and noise ratio associated with the operation, a threshold of connection time associated with the operation, a threshold of distance between the communication device and a serving cell or a serving carrier associated with the operation, or a threshold of an angle between the communication device and a neighboring cell or a candidate carrier. In some embodiments, the information is carried in a Radio Resource Control (RRC) message or broadcast in system information. In some embodiments, information transmitted to multiple communication devices is multiplexed in a single RRC message, the single RRC messing further comprising multiple identifiers corresponding to the multiple communication devices. In some embodiments, information transmitted to multiple communication devices is carried in multiple RRC messages each corresponding to a communication device, and the multiple RRC messages are multiplexed in a single Medium Access Control (MAC) Protocol Data Unit (PDU) that further comprises multiple identifiers corresponding to the multiple communication devices.

It is noted that, in some embodiments, the wireless communication node can be implemented as the satellite 103 as shown in FIG. 1. The communication device can be implemented as a user equipment 105 as shown in FIG. 1.

As further described in the present document, the above-described techniques provide efficient use of Discontinuous Reception to reduce power consumption while ensure that the communication devices can maintain its mobility when the serving cell changes. The techniques also allow the communication devices to autonomously initiate cell reselection or carrier switch procedures, thereby avoiding mobility issues caused by extra delays in the network. The techniques can further reduce signaling overhead by multiplexing information for multiple communication devices in a single message. Some examples of the disclosed techniques are further described in the following example embodiments.

Embodiment 1

A communication device (e.g., a user equipment) can use Discontinuous Reception (DRX) in the idle mode to reduce its power consumption. In every DRX cycle, the communication device monitors the Physical Downlink Control Channel (PDCCH) for paging messages when it is in an idle or inactive state. For example, when a neighbor cell satisfies the condition of the cell reselection, communication device can perform cell reselection and camp on the neighbor cell. The condition for triggering the cell reselection procedure can be the signal quality or a priority frequency associated with a cell. For example, when the signal quality of serving cell is lower than a threshold for a time duration (e.g., set by a cell reselection timer), the neighbor cell with a lower priority frequency can be considered as the candidate cell for the cell reselection procedure. As another example, when the signal quality of a neighbor cell is higher than a threshold for a time duration (e.g., set by the cell reselection timer), the neighbor cell can be considered as the candidate cell for the cell reselection procedure. As another example, in determining the cell-ranking, the priority of the frequency can be used to determine the absolute priority of the cells, and an additional offset can be added into the cell-ranking criterion of neighboring cells so as to adjust the priority of neighboring cells and the serving cell.

When a communication device is configured with a short DRX cycle (e.g., 1.28 s), the communication device can detect changes of signal strengths of the serving cell that are caused by the movement of satellite and can reselect another cell. However, when the communication device is configured with a long DRX cycle, such as 34 minutes or 12 days, it cannot receive signals from the serving cell in the DRX cycle when the serving satellite has changed. In those scenarios, the communication device needs to trigger the cell reselection procedure in every DRX cycle to find a new suitable cell to camp on. Conventional cell reselection techniques, such as evaluation of the channel quality of the serving cell or neighbor cell, or the priority of neighbor cells, can take a long time for the communication device to find a new suitable cell. Therefore, it is desirable to provide different conditions for triggering the cell reselection procedure that correspond to different DRX cycles. For the UE with the long DRX cycle, a faster cell reselection procedure can be introduced.

In some embodiments, the wireless node (e.g., the base station or the satellite) can configure parameters indicating different conditions for triggering the cell reselection procedure for different DRX cycles. The parameters can be included in a Radio Resource Control (RRC) message or broadcast in system information. The parameters can include the priority of the frequency, the cell reselection timer value, or an additional offset to be used for cell selection or reselection. For a communication device that has a long DRX cycle, the neighbor cell(s) can be prioritized for cell reselection. In some embodiments, a shorter cell reselection timer value can be set for a longer DRX cycle. Similarly, a smaller offset of the neighbor cell can be set for a longer DRX cycle. The communication device can select and apply those parameters based on its own DRX cycle. The communication device's DRX cycle can be broadcast or configured by the wireless node. In some embodiments, a special DRX cycle for the communication device can be configured by the network (e.g., the core network).

In some embodiments, the parameters can be organized as multiple sets of parameters in the RRC message or system information. Each set of parameters corresponds to a specific length of a DRX cycle. The RRC message or system information can configure multiple sets of parameters. One set of parameters can correspond to one or multiple DRX cycles. In some embodiments, one DRX cycle is given an index, and each set of parameters is associated with an index or multiple indices. In some embodiments, one DRX cycle is given an index, the multiple sets of parameters are associated with a bitmap that have bits ordered according to the indices of the DRC cycles. When a bit in the bitmap has a predetermined value (e.g., 1), the bit indicates that the corresponding set of parameters can be applied to the communication device that operates using the DRX cycle.

In some embodiments, each of the multiple sets of parameters corresponds to a threshold length of the DRX cycle. The communication device can select a set of parameters based on comparing its DRX cycle with the threshold length(s). For example, ParamSet1 corresponds to $DRX_{t1}$ and ParamSet2 correspond to $DRX_{t2}$. When the communication device has a DRX cycle that is lower than $DRX_{t1}$, ParamSet1 is used by the communication device in the cell reselection procedure. When the communication device has a DRX cycle that is lower than $DRX_{t2}$ but greater than or equal to $DRX_{t1}$, ParamSet2 is used by the communication device in cell reselection procedure.

In some embodiments, the indicator to disable some parameters corresponding to DRX cycles or DRX cycle thresholds can be included in the RRC message or system information. The communication device can determine the invalid parameter(s) based on its DRX cycle or based on comparing its DRX cycle length with the threshold length (s). For example, the indicators indicate the InvalidParam- Set1 and InvalidParamSet2, with InvalidParamSet1 corresponding to $DRX_{t1}$ and InvalidParamSet2 corresponding to $DRX_{t2}$. When the communication device has a DRX cycle that is lower than $DRX_{t1}$, the communication device refrains from using InvalidParamSet1 for the cell reselection procedure. When the communication device has a DRX cycle that is lower than $DRX_{t2}$ but greater than or equal to $DRX_{t1}$, the communication device refrains from using InvalidParamSet2 for the cell reselection procedure.

Embodiment 2

Intra-frequency or inter-frequency measurement can help communication devices determine when to reselect another more suitable cell. A communication device may perform the intra-frequency or inter-frequency measurements when it is in the coverage of the serving cell. However, due to the movement of satellite, the cell covering the communication device may be different in the next DRX cycle if a communication device has a long DRX cycle. The measurements that the communication device just performed now become useless. Therefore, it is desirable to perform intra-frequency or inter-frequency measurements in different manners according to different DRX cycles. For example, the conditions that trigger the intra-/inter-frequency measurements can be different for different DRX cycles.

In some embodiments, the wireless node (e.g., the base station or the satellite) can include configuration information in an RRC message or system information broadcast to the communication nodes. The configuration information can include parameters indicating the condition(s) to trigger the intra-frequency or inter-frequency measurements. In some embodiments, the parameters can indicate whether the inter-/intra-frequency measurements should be turned off for certain DRX cycle(s). In some embodiments, the parameters can further indicate a time duration associated with the inter-/intra-frequency measurements. For example, a timer can be used to track the time duration for which the communication device camps at the serving cell or the time duration for which the communication device measures a neighbor cell. If the timer value exceeds a threshold indicated by the parameter(s), the intra-/inter-frequency measurements can be turned off. In some embodiments, the configuration information can indicate a time duration corresponding to the DRX cycle of the communication device so that the communication device can turn off the intra-frequency or inter-frequency measurements for the time duration and turn the measurements back on afterwards.

In some embodiments, the parameters can be organized as multiple sets of parameters in the RRC message or system information. Each set of parameters corresponds to a specific length of a DRX cycle. The RRC message or system information can configure multiple sets of parameters according to DRX cycles. When the communication device operates using a particular DRX cycle, the corresponding set of parameters can be used to determine whether intra-/inter-frequency measurements should be turned on/off or be triggered. In some embodiments, one set of parameters can correspond to one or multiple DRX cycles. In some embodiments, one DRX cycle is given an index, and each set of parameters is associated with an index or multiple indices. In some embodiments, one DRX cycle is given an index, the multiple sets of parameters are related with a bitmap that have bits ordered according to the indices of the DRC cycles. When a bit in the bitmap has a predetermined value (e.g., 1), the bit indicates that the corresponding set of parameters can be applied to the communication device that operates using the DRX cycle.

In some embodiments, each of the multiple sets of parameters corresponds to a threshold length of the DRX cycle. The communication device can select a set of parameters based on comparing its DRX cycle with the threshold length(s). For example, ParamSet1 corresponds to $DRX_{t1}$ and ParamSet2 correspond to $DRX_{t2}$. When the communication device has a DRX cycle that is lower than $DRX_{t1}$, ParamSet1 is used by the communication device to determine whether inter-/intra-frequency measurements should be turned on/off or be triggered. When the communication device has a DRX cycle that is lower than $DRX_{t2}$ but greater than or equal to $DRX_{t1}$, ParamSet2 is used by the communication device to determine whether inter-/intra-frequency measurements should be turned on/off or be triggered.

In some embodiments, the conditions to trigger or turn on/off the measurements can be same or different for the intra-frequency and/or inter-frequency measurements. In some embodiments, a first condition is configured for the intra-frequency measurements and a second, different condition is configured for the inter-frequency measurements. The communication device can trigger the appropriate measurements respectively based on the different conditions. In some embodiments, the same condition is applicable to both intra-frequency and inter-frequency measurements. If the condition is satisfied, both measurements can be triggered by the communication device.

Embodiment 3

As discussed above, due to the movement of satellite, the cell covering the communication device may become different in the next DRX cycle when a communication device has a long DRX cycle. The measurements that the communication device just performed now become useless. Therefore, it is desirable to perform intra-frequency and/or inter-frequency measurements in different manners according to different DRX cycles. In some embodiments, if a communication device has a long DRX cycle, it can perform the intra-frequency and/or inter-frequency measurement immediately after it wakes up or after a time duration specified by the wireless node. In some embodiments, the communication device can perform or withhold the intra-frequency and/or inter-frequency measurements every DRX cycle or every several DRX cycles.

In some embodiments, the wireless node (e.g., the base station or the satellite) can include configuration information in an RRC message or system information broadcast to the communication nodes. The configuration information can include parameters indicating the condition(s) to trigger the intra-frequency and/or inter-frequency measurements. In some embodiments, the parameters can indicate the number of DRX cycle(s), one or more specific DRX cycle(s), or time durations that correspond to DRX cycles that measurements can be triggered. For example, the intra-frequency and/or inter-frequency measurements can be triggered after the number of DRX cycle(s) or time durations indicated by the parameters. The intra-frequency or inter-frequency measurements can be triggered every DRX cycle or every DRX N cycles, where N is a positive integer. As another example, the communication device can perform the intra-frequency and/or inter-frequency measurements when its DRX cycle is the same as the DRX cycle indicated by the parameter(s).

In some embodiments, the parameters can be organized as multiple sets of parameters in the RRC message or system information. Each set of parameters corresponds to a specific length of a DRX cycle. The communication device can select a set of parameters based on comparing its DRX cycle length with the threshold length(s). For example, ParamSet1 corresponds to $DRX_{t1}$ and ParamSet2 correspond to $DRX_{t2}$. When the communication device has a DRX cycle that is lower than $DRX_{t1}$, ParamSet1 (e.g., a time duration after the communication device wakes) is used by the communication device to determine whether intra-frequency and/or inter-frequency measurements should be turned on/off or be triggered. When the communication device has a DRX cycle that is lower than $DRX_{t2}$ but greater than or equal to $DRX_{t1}$, ParamSet2 is used by the communication device to determine whether intra-frequency and/or inter-frequency measurements should be turned on/off or be triggered. ParamSet1 and/or ParamSet2 can include information indicating a time duration after which the communication device can trigger intra-frequency or inter-frequency measurements. Alternatively, ParamSet1 and/or ParamSet2 can include information indicating a time duration for which the communication device should withhold intra-frequency and/or inter-frequency measurements. In some embodiments, separately time duration(s) can be used for intra-frequency and inter-frequency measurements. In some embodiments, the same time duration can be used for both intra-frequency and inter-frequency measurements.

Embodiment 4

A communication node (e.g., a user equipment) can leverage a neighbor cell list to reduce the time that it needs to find a more suitable cell. In NTN deployment, the neighbor cell list is predictable because satellites are moving in predictable paths. Accurate neighbor list allows the communication node to determine the next suitable cell in an efficient manner. Due to movement of the satellites, communication nodes with the different DRX cycles may search different cells and require different neighbor cell lists. For example, two communication devices UE1 and UE2 camp on cell 1. UE1 has a DRX cycle of 10.24 s. Its neighbor cell list includes cells that are in proximity to cell 1. UE2 has a much longer DRX cycle of 34 m. UE2's neighbor cell list includes cells that are far away from cell 1. Therefore, it is desirable to have the neighbor cell lists that correspond to different DRX cycles.

In some embodiments, a wireless node (e.g., a base station or the satellite) can configure different neighbor cell lists for different DRX cycles. The configuration information can be included in an interface message (e.g., a paging message), a Radio Resource Control (RRC) message, or broadcast in system information. The configuration information can carry a communication device identifier, such as a Serving Temporary Mobile Subscriber Identity, as well as a list of neighbor cell information (e.g., frequency, and/or Physical Cell Identifier, PCI) corresponding to different DRX cycles. For example, list1 is configured for DRX cycle 1 and list2 is configured for DRX cycle 2. More specifically, list1 can include elements such as T1:cell1, cell2, cell, where T1 is related with the length of one DRX cycle. Similarly, list2 can include elements such as T2:cell4, cell5, cell6, where T2 is related with the length of another DRX cycle. The communication node can select the appropriate neighbor cell list based on its DRX cycle.

In some embodiments, the neighbor cell lists can be organized as multiple sets. Each set of parameters corresponds to one or more DRX cycles. When the communication device operates using a particular DRX cycle, the corresponding set of neighbor cell lists can be used for cell search. In some embodiments, one set of parameters can correspond to one or multiple DRX cycles. In some embodiments, one DRX cycle is given an index, and each set of parameters is associated with an index or multiple indices. In some embodiments, one DRX cycle is given an index, the multiple sets of parameters are related with a bitmap that have bits ordered according to the indices of the DRC cycles. When a bit in the bitmap has a predetermined value (e.g., 1), the bit indicates that the corresponding set of parameters can be applied to the communication device that operates using the DRX cycle.

In some embodiments, each of the multiple sets corresponds to a threshold length of the DRX cycle. The communication device can select a set of neighbor cell list(s) based on comparing its DRX cycle with the threshold length(s). For example, CellListSet1 corresponds to $DRX_{t1}$ and CellListSets correspond to $DRX_{t2}$. When the communication device has a DRX cycle that is lower than $DRX_{t1}$, CellListSet1 is used by the communication device to perform cell search. When the communication device has a DRX cycle that is lower than $DRX_{t2}$ but greater than or equal to $DRX_{t1}$, CellListSet2 is used by the communication device to perform cell search.

Embodiment 5

Measurements for the serving cell and neighbor cells consume power for communication devices, especially for NB-IoT and eMTC communication devices in RRC connected mode. To reduce power consumption, those devices do not always perform measurements. Yet the measurement results are beneficial to the communication devices or the wireless node(s) to determine whether a handover procedure should occur. To balance power consumption and communication device mobility, it is thus desirable to send configuration information to a communication device indicating condition(s) under which the communication device can trigger an operation, such as intra-frequency or inter-frequency measurements. The results of intra-frequency or inter-frequency measurements can further assist the wireless node or the communication device to determine whether a handover procedure is necessary.

In some embodiments, the communication device can trigger intra-frequency and/or inter-frequency measurements when the timing advance (TA) value of the serving cell reaches a threshold. The wireless node (e.g., the base station or the satellite) can configure TA threshold(s) in an RRC message or broadcast it in the system information. When the TA value reaches or exceeds the TA threshold(s), the communication node can trigger the intra-frequency and/or inter-frequency measurements.

In some embodiments, due to satellite movements, the communication device can trigger intra-frequency and/or inter-frequency measurements when a duration for which the communication device is connected with the serving cell reaches a threshold. The wireless node (e.g., the base station or the satellite) can include configuration information, such as one or more time thresholds or one or more time durations, in an RRC message or broadcast in the system information. When the connection time (e.g., time since the communication device enters the RRC connected state) reaches a threshold or a duration specified in the configuration information, the communication device can trigger intra-frequency or inter-frequency measurements. In some embodiments, separate thresholds can be used for intra-frequency measurements and inter-frequency measurements. For example, a first timer that tracks the connection time can be compared to a first threshold to determine whether intra-frequency measurements should be triggered. A second timer that tracks the connection time can be compared to a first threshold to determine whether inter-frequency measurements should be triggered. In some embodiments, a single threshold can be used for both intra-frequency measurements and inter-frequency measurements. For example, a timer that tracks the connection time can be compared to a threshold to determine whether both intra-frequency and inter-frequency measurements should be triggered. The timer(s) can start after the communication device enters the connected state and stop when the communication device enters the idle state.

Embodiment 6

Some communication devices may not support handover procedures when the serving cell changes. For example, NB-IoT communication devices cannot perform handover procedures but rely on RRC reestablishment procedure to other cells when the signal of the serving cell deteriorates. Conventionally, RRC reestablishment procedure is triggered by Radio Link Failure (RLF). However, detecting RLF requires a long time. For NTN deployments, due to the movement of satellite, communication devices may be already under the coverage of a neighbor cell while the RRC reestablishment procedure is just triggered. Therefore, it is desirable to trigger RRC reestablishment procedures in advance for certain types of communication devices.

In some embodiments, the wireless node (e.g., the base station or the satellite) can configure the condition(s) to trigger reestablishment procedure and the candidate target cell. For example, configuration information can be carried in an RRC message or broadcast in system information. The configuration information can include one or more thresholds that can trigger the reestablishment procedure and neighbor cells' information, including but not limited to PCI, radio resource configuration, etc.

In some embodiments, the one or more thresholds are associated with a Signal and Interference to Noise Ratio (SINR). For example, when the measured SINR of the serving cell is lower than or equal to a threshold, the communication device can trigger the reestablishment procedure. As another example, when the measured SINR of a neighbor cell is equal to or greater than a threshold, the communication device can trigger the reestablishment procedure. In some embodiments, when the measured SINR of a neighbor cell is equal to or greater than he measured SINR of a serving cell above a threshold, the communication device can trigger the reestablishment procedure.

In some embodiments, the one or more thresholds are associated with a connection time of the communication device. For example, when the communicate device stays in the RRC connected state with a serving cell for a time duration that reaches or exceeds a threshold, the communication device can trigger the reestablishment procedure.

In some embodiments, the one or more thresholds are associated with a TA value of a cell. For example, when the TA value of the serving cell is equal to or greater than a threshold, the communication device can trigger the reestablishment procedure. As another example, when the TA value of a neighbor cell is equal to or smaller than a threshold, the communication device can trigger the reestablishment procedure. In some embodiments, when the TA value of a neighbor cell is equal to or smaller than the TA value of a serving cell above a threshold, the communication device can trigger the reestablishment procedure.

In some embodiments, the one or more thresholds are associated with a distance between the communication device and the cell(s). The distance between communication device and a cell can be determined by comparing the location of communication device and the satellite or the reference point of the cell. For example, when the distance between the communication device and the serving cell is equal to or greater than a threshold, the communication device can trigger the reestablishment procedure. As another example, when the distance between the communication device and a neighbor cell is equal to or smaller than a threshold, the communication device can trigger the reestablishment procedure. In some embodiments, the distance between the communication device and a neighbor cell is equal to or smaller than the distance between the communication device and the serving cell above a threshold, the communication device can trigger the reestablishment procedure.

In some embodiments, the one or more thresholds are associated with an angle between the communication device and the cell(s). The angle between the communication device and a cell can be determined by comparing the location of the communication device and the satellite or the reference point of the cell. For example, when the angle between the communication device and the serving cell is equal to or smaller than a threshold, the communication device can trigger the reestablishment procedure. As another example, when the angle between the communication device and a neighbor cell is equal to or greater than a threshold, the communication device can trigger the reestablishment procedure. In some embodiments, when the angle between the communication device and a neighbor cell is equal to or greater than the angle between the communication device and the serving cell above a threshold, the communication device can trigger the reestablishment procedure.

In some embodiments, the one or more thresholds can be associated with a combination of the SINR, the connection time, the TA value, a distance and/or an angle between the communication device and a cell.

Embodiment 7

When a communication device is in communication with a multi-carrier cell, the communication device can switch from a carrier to another based on indications from the wireless node (e.g., the base station or the satellite). For example, NB-IoT communication devices can switch to another carrier when the wireless node indicates so in an RRC reconfiguration message. However, due to the large propagation delay, it may take too much time for the communication device to receive the RRC reconfiguration. It is thus desirable for the communication node to trigger carrier switch on time.

In some embodiments, the wireless node (e.g., the base station or the satellite) can configure the condition(s) to trigger carrier switch to allow the communication device to determine whether carrier switch should be performed. For example, configuration information can be carried in an RRC message or broadcast in system information. The configuration information can include one or more thresholds that can trigger carrier switch and additional information about candidate carrier(s), including but not limited to carrier frequency, radio resource configuration, etc. In some embodiments, the candidate carriers can be ranked according to various factors. For example, the candidate carriers can be ranked based on a descending order of the SINR of each carrier, an ascending order of the TA value of each carrier, an ascending order of the distance between each carrier and the communication device, or a descending order of the angle between each carrier and the communication device. Based on the rankings, the communication device can choose the best carrier to switch. If communication device fails to switch to the best carrier, communication device can switch to the next best carrier according to the ranking.

In some embodiments, the one or more thresholds are associated with a Signal and Interference to Noise Ratio (SINR). For example, when the measured SINR of the serving carrier is lower than or equal to a threshold, the communication device can trigger the carrier switch procedure. As another example, when the measured SINR of a candidate carrier is equal to or greater than a threshold, the communication device can trigger the carrier switch procedure. In some embodiments, when the measured SINR of a candidate carrier is equal to or greater than he measured SINR of a serving carrier above a threshold, the communication device can trigger the carrier switch procedure.

In some embodiments, the one or more thresholds are associated with a connection time of the communication device. For example, when the communicate device stays in the RRC connected state with a serving carrier for a time duration that reaches or exceeds a threshold, the communication device can trigger the carrier switch procedure to switch to the target carrier.

In some embodiments, the one or more thresholds are associated with a TA value of a carrier. For example, when the TA value of the serving carrier is equal to or greater than a threshold, the communication device can trigger the carrier switch procedure. As another example, when the TA value of a candidate carrier is equal to or smaller than a threshold, the communication device can trigger the carrier switch procedure. In some embodiments, when the TA value of a candidate carrier is equal to or smaller than the TA value of a serving carrier above a threshold, the communication device can trigger the carrier switch procedure.

In some embodiments, the one or more thresholds are associated with a distance between the communication device and the candidate carrier(s). The distance between communication device and a carrier can be determined by comparing the location of communication device and a reference point of the carrier. For example, when the distance between the communication device and the serving carrier is equal to or greater than a threshold, the communication device can trigger the carrier switch procedure. As another example, when the distance between the communication device and a candidate carrier is equal to or smaller than a threshold, the communication device can trigger the carrier switch procedure. In some embodiments, when the distance between the communication device and a candidate carrier is equal to or smaller than the distance between the communication device and the serving carrier above a threshold, the communication device can trigger the carrier switch procedure.

In some embodiments, the one or more thresholds are associated with an angle between the communication device and the carrier(s). The angle between the communication device and a carrier can be determined by comparing the location of the communication device and a reference point of the carrier. For example, when the angle between the communication device and the serving carrier is equal to or greater than a threshold, the communication device can trigger the carrier switch procedure. As another example, when the angle between the communication device and a candidate carrier is equal to or smaller than a threshold, the communication device can trigger the carrier switch procedure. In some embodiments, when the angle between the communication device and a candidate carrier is equal to or greater than the angle between the communication device and the serving carrier, the communication device can trigger the carrier switch procedure.

In some embodiments, the one or more thresholds can be associated with a combination of the SINR, the connection time, the TA value, or a distance and/or an angle between the communication device and a carrier.

Embodiment 8

The techniques described above allow the communication node to autonomously trigger the carrier switch procedure when certain condition(s) are satisfied. When the communication device completes the carrier switch procedure, it is necessary for the wireless node to be aware of the change, otherwise the wireless node can transmit incorrect scheduling information with respect to the old carrier. To ensure transmission consistency between the wireless node and the communication device, the communication device can notify the wireless node of the carrier switch once the switching procedure is completed.

In some embodiments, the communication device can send an uplink (UL) signal in the candidate/target carrier to the wireless node. The UL signal can include a random-access channel (RACH) preamble, a Sounding Reference Signal (SRS), a signal on the Physical Uplink Shared Channel (PUSCH), a Demodulation Reference Signal (DMRS), etc. In some embodiments, the wireless node can configure one or more dedicated UL resources in the candidate/target carrier(s) for transmitting the UL signal. Information regarding the dedicated UL resources can be carried in an RRC message, such as an RRC reconfiguration message. The dedicated UL resource(s) can include resources for the preamble index, SRS sequence, DMRS sequence, the RACH resource in frequency and time domain, the SRS resource in frequency and time domain, the PUSCH resource in frequency and time domain, or the DMRS resource in frequency and time domain, etc.

In some embodiments, the resource(s) can be scheduled periodically in time domain. In some embodiments, the resource(s) can be scheduled in an aperiodic manner (e.g., one-time use). In some embodiments, a valid time-domain position or a valid time duration can be configured for transmitting the UL signal. For example, the dedicated resource(s) become valid after the communication device receives the configuration of the dedicated resource and remain valid up until the valid time-domain position. In some embodiments, a timer having a valid time duration is started once the communication device receives the configuration of the dedicated resource(s). Once the timer expires, the dedicated resource(s) become invalid for comunication device. In some embodiments, the timer stops when the communication device receives a message from the wireless node or completes the switching procedure.

After receiving the UL signal, the wireless node can transmit a downlink (DL) signal, such as a Downlink Control Indicator (DCI) message, as a response. If the dedicated UL resource(s) become valid or the communication device fails to receive the response from the wireless node, the communication device can attempt the transmission of the UL signal again. The communication device can keep track of the number of UL transmission attempts it makes to transmit the UL signal. When the number of UL transmission attempts reaches a threshold, the carrier switch procedure can be deemed as have failed. In some embodiments, the communication device can keep a timer to track the time between transmitting the first UL signal and receiving the response from the wireless node. If the timer reaches a threshold, the carrier switch procedure can be deemed as have failed. Alternatively, the timer can be given a duration. When the timer expires, the carrier switch procedure can be deemed as have failed. The threshold(s) and/or the duration can be configured by the wireless node. Upon detecting a failure of the carrier switch procedure, the communication device can initiate a reestablishment procedure.

Embodiment 9

Configuration information transmitted by the wireless node to enable cell reselection or carrier switch procedures described above can lead to large signaling overhead. To reduce or minimize signaling overhead associated with such procedures, information for multiple communication devices can be multiplexed in one or a smaller number of messages.

In some embodiments, the wireless node can multiplex multiple RRC messages into one Protocol Data Unit (PDU) in the Medium Access Control (MAC) layer, each RRC message carrying information for a corresponding communication device. For example, the wireless node needs to transmit, for each of the multiple communication devices, an RRC reconfiguration message that initiates a handover procedure. The RRC reconfiguration message can carry communication device identities, such as Cell Radio Network Temporary Identifier (C-RNTI), for the communication devices. When the communication devices receive the MAC PDU, each communication device can demultiplex the PDU and decode the RRC message based on its own identifier.

In some embodiments, the wireless node can multiplex multiple RRC messages into one Protocol Data Unit (PDU) in the Medium Access Control (MAC) layer, each RRC message carrying information for a corresponding communication device. For example, the wireless node needs to transmit, for each of the multiple communication devices, an RRC reconfiguration message that initiates a handover procedure. The MAC PDU can carry communication device identities, such as Cell Radio Network Temporary Identifier (C-RNTI), for the communication devices. When the communication devices receive the MAC PDU, each communication device can demultiplex the PDU and decode the RRC message based on its own identifier.

In some embodiments, the wireless node can multiplex information for multiple communication devices into a common RRC message. Each part of the information is associated with a communication device identifier, such as Cell Radio Network Temporary Identifier (C-RNTI). When the communication devices receive the common RRC message, each communication device can decode the RRC message based on its own identifier.

Figure 4:
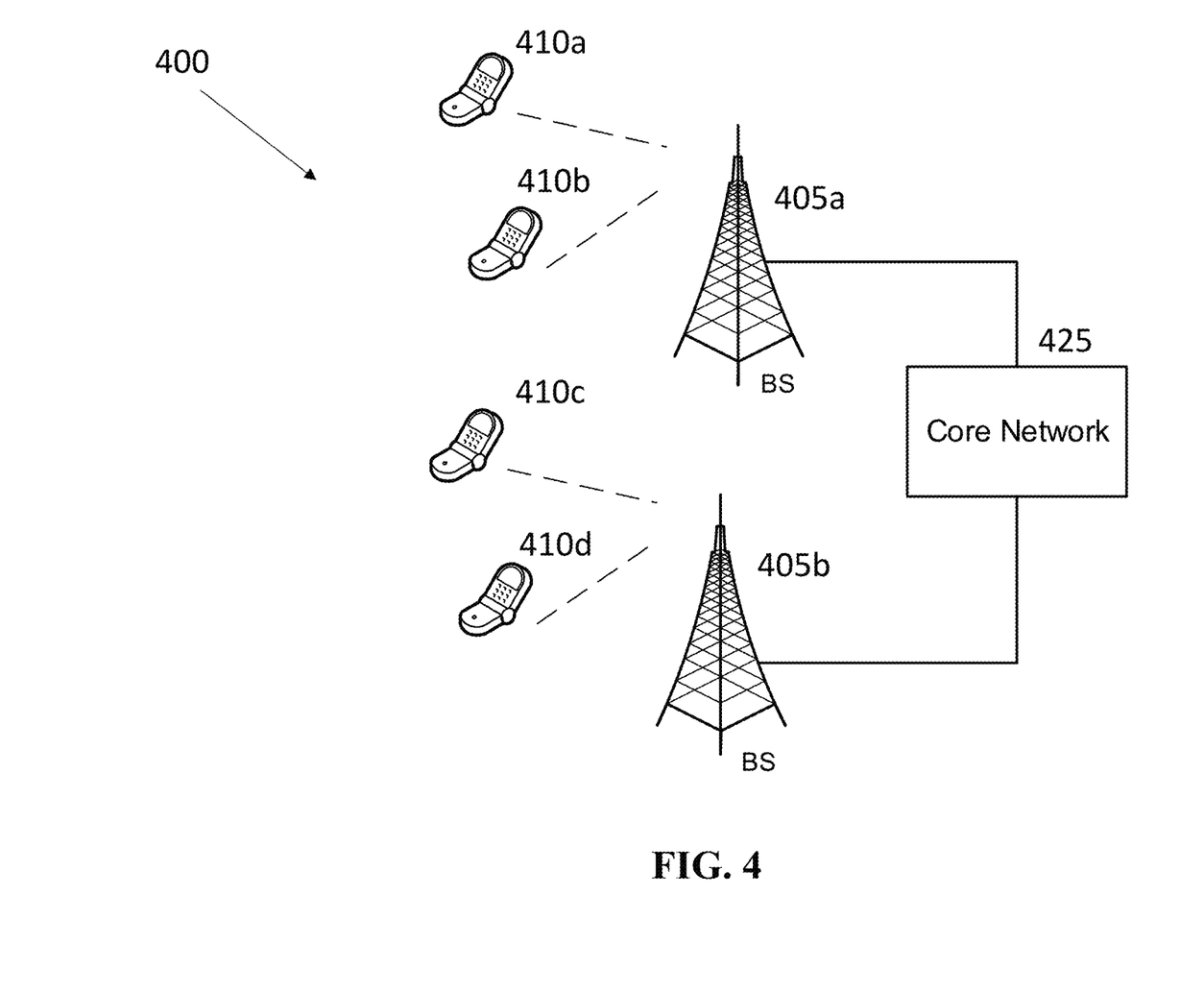
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies. The techniques and embodiments described in the present document may be implemented by the base stations of wireless devices described in the present document.

Figure 5:
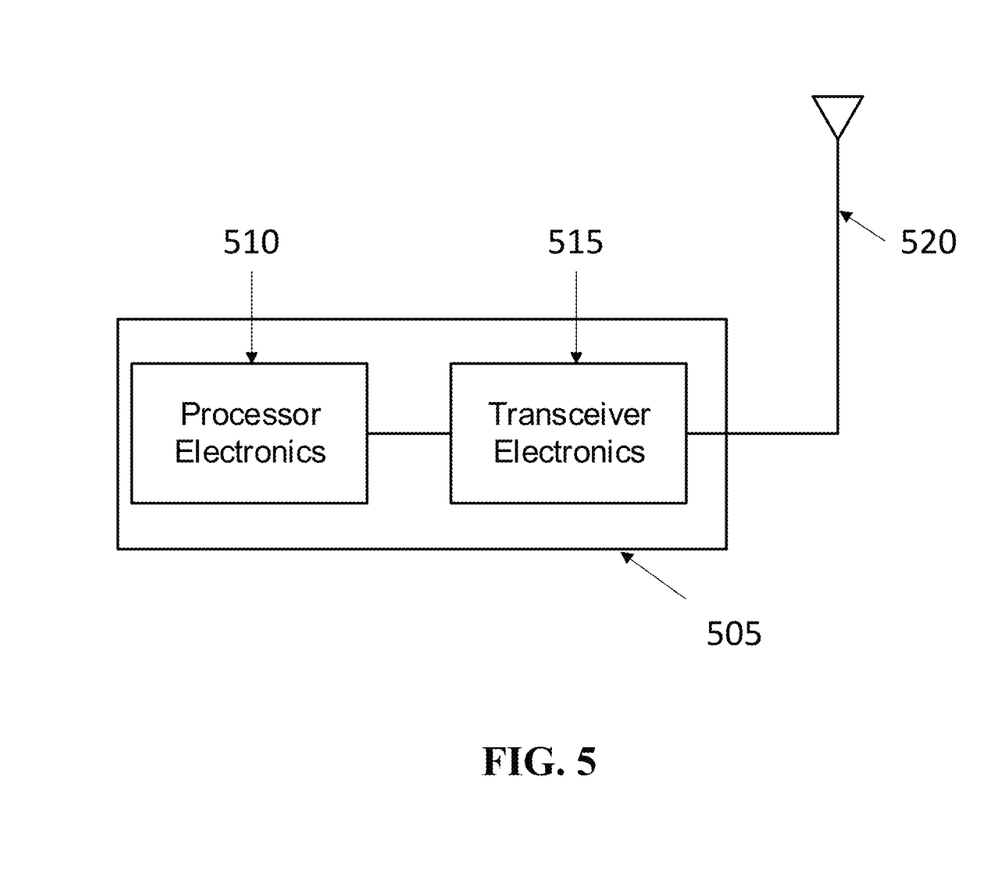
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a base station or a wireless device (or communication device) can include processor electronics 510 such as a microprocessor that implements one or more of the wireless techniques presented in this document. The radio station 605 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505. In some embodiments, the radio station 505 may be configured to perform the methods described herein.

It will be appreciated that the present document discloses techniques that can be embodied in various embodiments to reduce signaling overhead as well as power consumption while ensuring mobility of communication devices in non-terrestrial network deployment as well as terrestrial network deployment. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a communication device from a wireless communication node, information comprising a plurality of configuration parameters for multiple discontinuous reception cycles, each of the plurality of configuration parameters corresponding to a triggering condition for a cell reselection procedure associated with a length of a different discontinuous reception cycle;
selecting, by the communication device, a configuration parameter from the plurality of configuration parameters based on a discontinuous reception cycle configured for the communication device; and
triggering, by the communication device, the cell reselection procedure based on the triggering condition corresponding to the configuration parameter.

2. The method of claim 1, wherein the configuration parameter comprises at least one of: a cell reselection timer value, a priority of frequency, or an offset to be used for cell reselection, and wherein the cell reselection timer value or the offset to be used for cell reselection negatively correlates to a length of the discontinuous reception cycle of the communication device.

3. The method of claim 1, wherein the information comprises multiple sets of configuration parameters, each of the plurality of configuration parameters being part of one of the multiple sets of configuration parameters for the cell reselection procedure, and each set corresponding to a different triggering condition for the cell reselection procedure associated with a threshold length of a respective discontinuous reception cycle supported by the communication device.

4. The method of claim 3, wherein each discontinuous reception cycle is associated with an index, and wherein the multiple sets of configuration parameters correspond to a bitmap that comprises bits ordered according to indices of discontinuous reception cycles.

5. The method of claim 1, wherein the configuration parameter indicates an invalid value related to the discontinuous reception cycle of the communication device.

6. A method for wireless communication, comprising:
transmitting, by a wireless communication node to a communication device, information comprising a plurality of configuration parameters for multiple discontinuous reception cycles, each of the plurality of configuration parameters corresponding to a triggering condition for a cell reselection procedure associated with a length of a different discontinuous reception cycle to enable the communication device to select a configuration parameter from the plurality of configuration parameters based on a discontinuous reception cycle configured for the communication device, and trigger the cell reselection procedure based on the triggering condition corresponding to the configuration parameter.

7. The method of claim 6, wherein the configuration parameter comprises at least one of: a cell reselection timer value, a priority of frequency, or an offset to be used for cell reselection, and wherein the cell reselection timer value or the offset to be used for cell reselection negatively correlates to a length of the discontinuous reception cycle of the communication device.

8. The method of claim 6, wherein the information comprises multiple sets of configuration parameters, each of the plurality of configuration parameters being part of one of the multiple sets of configuration parameters for the cell reselection procedure, and each set corresponding to a different triggering condition for the cell reselection procedure associated with a threshold length of a respective discontinuous reception cycle supported by the communication device.

9. The method of claim 8, wherein each discontinuous reception cycle is associated with an index, and wherein multiple sets of configuration parameters correspond to a bitmap that comprises bits ordered according to indices of discontinuous reception cycles.

10. The method of claim 6, wherein the configuration parameter indicates an invalid value related to the discontinuous reception cycle of the communication device.

11. A communication device, comprising a processor configured to:
    receive, from a wireless communication node, information comprising a plurality of configuration parameters for multiple discontinuous reception cycles each of the plurality of configuration parameters corresponding to a triggering condition for a cell reselection procedure associated with a length of a different discontinuous reception cycle;
    select a configuration parameter from the plurality of configuration parameters based on a discontinuous reception cycle configured for the communication device; and
    trigger the cell reselection procedure based on the triggering condition corresponding to the configuration parameter.

12. The communication device of claim 11, wherein the configuration parameter comprises at least one of: a cell reselection timer value, a priority of frequency, or an offset to be used for cell reselection, and wherein the cell reselection timer value or the offset to be used for cell reselection negatively correlates to a length of the discontinuous reception cycle of the communication device.

13. The communication device of claim 11, wherein the information comprises multiple sets of configuration parameters, each of the plurality of configuration parameters being part of one of the multiple sets of configuration parameters for the cell reselection procedure, and each set corresponding to a different triggering condition for the cell reselection procedure associated with a threshold length of a respective discontinuous reception cycle supported by the communication device.

14. The communication device of claim 13, wherein each discontinuous reception cycle is associated with an index, and wherein the multiple sets of configuration parameters correspond to a bitmap that comprises bits ordered according to indices of discontinuous reception cycles.

15. The communication device of claim 11, wherein the configuration parameter indicates an invalid value related to the discontinuous reception cycle of the communication device.

16. A wireless communication node, comprising a processor configured to:
    transmit, to a communication device, information comprising a plurality of configuration parameters for multiple discontinuous reception cycles, each of the plurality of configuration parameters corresponding to a triggering condition for a cell reselection procedure associated with a length of a different discontinuous reception cycle to enable the communication device to select a configuration parameter from the plurality of configuration parameters based on a discontinuous reception cycle configured for the communication device, and trigger the cell reselection procedure based on the triggering condition corresponding to the configuration parameter.

17. The wireless communication node of claim 16, wherein the configuration parameter comprises at least one of: a cell reselection timer value, a priority of frequency, or an offset to be used for cell reselection, and wherein the cell reselection timer value or the offset to be used for cell reselection negatively correlates to a length of the discontinuous reception cycle of the communication device.

18. The wireless communication node of claim 16, wherein the information comprises multiple sets of configuration parameters, each of the plurality of configuration parameters being part of one of the multiple sets of configuration parameters for the cell reselection procedure, and each set corresponding to a different triggering condition for the cell reselection procedure associated with a threshold length of a respective discontinuous reception cycle supported by the communication device.

19. The wireless communication node of claim 18, wherein each discontinuous reception cycle is associated with an index, and wherein the multiple sets of configuration parameters correspond to a bitmap that comprises bits ordered according to indices of discontinuous reception cycles.

20. The wireless communication node of claim 16, wherein the configuration parameter indicates an invalid value related to the discontinuous reception cycle of the communication device.

* * * * *